(12) United States Patent
Koller et al.

(10) Patent No.: US 8,639,192 B2
(45) Date of Patent: Jan. 28, 2014

(54) RF FEEDBACK RECEIVER ARRANGEMENT, RF TRANSMIT ARRANGEMENT AND RF TRANSCEIVER ARRANGEMENT

(75) Inventors: Rainer Koller, Engerwitzdorf (AT); Josef Zipper, Judendorf-Strassengel (AT)

(73) Assignee: Intel Mobile Communications GmbH, Neubiberg (DE)

( * ) Notice: Subject to any disclaimer, the term of this patent is extended or adjusted under 35 U.S.C. 154(b) by 185 days.

(21) Appl. No.: 13/341,058

(22) Filed: Dec. 30, 2011

(65) Prior Publication Data

US 2012/0214426 A1 Aug. 23, 2012

(30) Foreign Application Priority Data

Dec. 30, 2010 (DE) .......................... 10 2010 064 396

(51) Int. Cl.
*H04B 1/38* (2006.01)

(52) U.S. Cl.
USPC .............. 455/73; 455/126; 455/69; 455/227; 455/67.11; 455/67.13; 455/127.1; 455/333; 375/254; 375/296; 375/325; 375/349; 330/149

(58) Field of Classification Search
USPC .............. 455/73, 126, 69, 227, 67.11, 67.13, 455/127.1, 333
See application file for complete search history.

(56) References Cited

U.S. PATENT DOCUMENTS

| | | | |
|---|---|---|---|
| 6,275,685 B1 | 8/2001 | Wessel et al. | |
| 7,035,345 B2 | 4/2006 | Jeckeln et al. | |
| 7,113,036 B2 * | 9/2006 | Moffatt et al. | 330/149 |
| 7,548,590 B2 * | 6/2009 | Koller et al. | 375/295 |
| 7,679,449 B2 * | 3/2010 | Behzad et al. | 330/285 |
| 7,868,696 B2 * | 1/2011 | Behzad et al. | 330/285 |
| 8,030,973 B2 * | 10/2011 | Li et al. | 327/72 |
| 8,149,950 B2 * | 4/2012 | Kim et al. | 375/296 |
| 8,213,884 B2 * | 7/2012 | Kim et al. | 455/114.3 |
| 8,219,044 B2 * | 7/2012 | Nielsen | 455/114.3 |
| 8,351,978 B2 * | 1/2013 | Tasic et al. | 455/550.1 |
| 8,532,577 B2 * | 9/2013 | Behzad et al. | 455/63.3 |
| 2010/0022208 A1 | 1/2010 | Cole et al. | |

FOREIGN PATENT DOCUMENTS

WO          0163791 A2    8/2001

* cited by examiner

*Primary Examiner* — Marceau Milord
(74) *Attorney, Agent, or Firm* — Eschweiler & Associates, LLC (57) ABSTRACT

An RF feedback receiver arrangement includes a reference signal provider configured to provide, in a normal operating phase, a first reference signal having a first reference signal frequency, and provide, in a calibration operating phase, a second reference signal having a second reference signal frequency different from the first reference signal frequency. In addition, the RF feedback receiver arrangement includes a signal property detector configured to detect a transmit signal property of the transmit signal in the normal operating phase based on combining the first reference signal with a transmit signal or with a signal derived from the transmit signal, and to obtain, in the calibration operating phase, a calibration signal based on combining the second reference signal with the transmit signal or the signal derived from the transmit signal, which describes a disturbing portion introduced into the detected transmit signal property by the RF feedback receiver arrangement itself.

27 Claims, 4 Drawing Sheets

RF FEEDBACK RECEIVER ARRANGEMENT, RF TRANSMIT ARRANGEMENT AND RF TRANSCEIVER ARRANGEMENT

REFERENCE TO RELATED APPLICATION

This application claims priority to German Patent Application No. 102010064396.3, which was filed on Dec. 30, 2010 and is incorporated herein in its entirety by reference.

FIELD

Embodiments provide an RF feedback receiver arrangement as may be applied, for example, in an RF transmit arrangement or an RF transceiver arrangement. Further embodiments provide an RF transmit arrangement and an RF transceiver arrangement.

BACKGROUND OF THE INVENTION

In RF transmit arrangements (such as mobile radio transmitters, for example), measurement of a signal property, such as of a power, of a transmit signal of the RF transmit arrangement may be useful in order to control a power emitted by the RF transmit arrangement. Systems used for measuring the signal property of such transmit signals will typically introduce a disturbing portion into the signal property measured and will thus distort the measuring result.

SUMMARY

According to an embodiment, an RF feedback receiver arrangement for detecting a transmit signal property of a transmit signal of an RF transmit arrangement is disclosed. The RF feedback receiver arrangement having a normal operating phase and a calibration operating phase comprises a reference signal provider configured to provide, in the normal operating phase, a first reference signal having a first reference signal frequency and provide, in the calibration operating phase, a second reference signal having a second reference signal frequency, which differs from the first reference signal frequency. The arrangement further comprises a signal property detector configured to detect, in the normal operating phase, the transmit signal property based on a combination of the first reference signal with the transmit signal or with a signal derived from the transmit signal. The signal property detector is further configured to acquire, in the calibration operating phase, a calibration signal based on a combination of the second reference signal with the transmit signal or with the signal derived from the transmit signal. The calibration signal describes a disturbing portion introduced into the detected transmit signal property by the RF feedback receiver arrangement itself.

According to another embodiment, an RF transmit arrangement for providing a transmit signal comprises an RF feedback receiver arrangement for detecting a transmit signal property of a transmit signal of an RF transmit arrangement. The RF feedback receiver arrangement has a normal operating phase and a calibration operating phase, and the RF feedback receiver arrangement comprises a reference signal provider configured to provide, in the normal operating phase, a first reference signal having a first reference signal frequency and provide, in the calibration operating phase, a second reference signal having a second reference signal frequency, which differs from the first reference signal frequency. The arrangement further comprises a signal property detector configured to detect, in the normal operating phase, the transmit signal property based on a combination of the first reference signal with the transmit signal or with a signal derived from the transmit signal. The signal property detector is further configured to acquire, in the calibration operating phase, a calibration signal based on a combination of the second reference signal with the transmit signal or with the signal derived from the transmit signal, the calibration signal describing a disturbing portion introduced into the detected transmit signal property by the RF feedback receiver arrangement itself. The arrangement still further comprises a first signal generator for generating a transmit carrier signal having a transmit carrier frequency and for generating the first reference signal, wherein first reference signal is based on the transmit carrier signal, and a second signal generator for generating the second reference signal. Lastly, the arrangement comprises a transmit path for providing the transmit signal based on a combination of the transmit carrier signal with a transmit baseband signal, wherein the transmit path is configured to provide the transmit signal or the signal derived from the transmit signal at the signal property detector of the RF feedback receiver arrangement.

According to another embodiment, an RF transceiver arrangement for receiving a receive signal and for providing a transmit signal comprises an RF feedback receiver arrangement for detecting a transmit signal property of a transmit signal of an RF transmit arrangement. The RF feedback receiver arrangement has a normal operating phase and a calibration operating phase, and the RF feedback receiver arrangement comprises a reference signal provider configured to provide, in the normal operating phase, a first reference signal having a first reference signal frequency and provide, in the calibration operating phase, a second reference signal having a second reference signal frequency, which differs from the first reference signal frequency. The arrangement also comprises a signal property detector configured to detect, in the normal operating phase, the transmit signal property based on a combination of the first reference signal with the transmit signal or with a signal derived from the transmit signal. The signal property detector is further configured to acquire, in the calibration operating phase, a calibration signal based on a combination of the second reference signal with the transmit signal or with the signal derived from the transmit signal, wherein the calibration signal describes a disturbing portion introduced into the detected transmit signal property by the RF feedback receiver arrangement itself. The arrangement further comprises a first signal generator for generating a transmit carrier signal having a transmit carrier frequency and for generating the first reference signal, wherein the first reference signal is based on the transmit carrier signal, and a second signal generator for generating a receive carrier signal having a receive carrier frequency and for generating the second reference signal, wherein the second reference signal is based on the receive carrier signal. The arrangement still further comprises a transmit path for providing the transmit signal based on a combination of the transmit carrier signal with a transmit baseband signal, wherein the transmit path is configured to provide the transmit signal or the signal derived from the transmit signal at the signal property detector of the feedback receiver arrangement. Finally, the arrangement comprises a receive path for providing a receive baseband signal based on a combination of the receive signal or of a signal derived therefrom with the receive carrier signal.

Another embodiment may have an RF feedback receiver arrangement for detecting a transmit signal property of a transmit signal of an RF transmit arrangement. The RF feedback receiver arrangement is configured to detect, in a normal operating phase, the transmit signal property based on a combination of a first reference signal having a first reference signal frequency with the transmit signal or with a signal derived from the transmit signal, and to acquire, in a calibration operating phase, a calibration signal based on a combination of a second reference signal having a second reference signal frequency which differs from the first reference signal frequency with the transmit signal or with the signal derived from the transmit signal. The calibration signal describes a disturbing portion introduced into the detected transmit signal property by the RF feedback receiver arrangement itself.

According to another embodiment, an RF feedback receiver arrangement for detecting a transmit signal property of a transmit signal of an RF transmit arrangement is disclosed. The RF feedback receiver arrangement has a normal operating phase and a calibration operating phase, and comprises a reference signal provider configured to provide, in the normal operating phase, a first reference signal having a first reference signal frequency and provide, in the calibration operating phase, a second reference signal having a second reference signal frequency, which differs from the first reference signal frequency. The arrangement also comprises a signal property detector configured to detect, in the normal operating phase, the transmit signal property based on a combination of the first reference signal with the transmit signal or with a signal derived from the transmit signal. The signal property detector is further configured to acquire, in the calibration operating phase, a calibration signal based on a combination of the second reference signal with the transmit signal or with the signal derived from the transmit signal, wherein the calibration signal describes a disturbing portion introduced into the detected transmit signal property by the RF feedback receiver arrangement itself. The signal property detector is configured—in a case where the first reference signal is a carrier signal of the transmit signal—to mix the transmit signal or the signal derived from the transmit signal with the first reference signal into a baseband, in the normal operating phase, based on the combination of the transmit signal or of the signal derived from the transmit signal, so as to detect the transmit signal property based on the transmit signal mixed into the baseband or on the basis of the signal derived from the transmit signal and mixed into the baseband. The signal property detector is further configured to mix the transmit signal or the signal derived from the transmit signal, in the calibration operating phase, into a band shifted to the baseband in the combination of the second reference signal with the transmit signal or with the signal derived from the transmit signal, and to mix the self-introduced disturbing portion into the baseband so as to acquire the calibration signal from the disturbing portion mixed into the baseband. The reference signal provider comprises a first input terminal for receiving the first reference signal, a second input terminal for receiving the second reference signal, and an output terminal for providing the first reference signal and for providing the second reference signal. The reference signal provider further comprises a change-over switch configured to couple, in the normal operating phase, the first input terminal to the output terminal and to couple, in the calibration operating phase, the second input terminal to the output terminal. The reference signal provider comprises a transmission path connected between the change-over switch and the second input terminal, said transmission path having a first transmission path switch to decouple the second input terminal from the change-over switch in the normal operating phase. The transmission path of the reference signal provider further comprises a second transmission path switch and a shielded line, the shielded line being connected between the first transmission path switch and the second transmission path switch. The reference signal provider is configured to decouple the shielded line from the second input terminal and from the change-over switch in the normal operating phase while utilizing the first transmission path switch and the second transmission path switch, wherein the transmission path comprises an attenuator, an amplifier and a shielded line connected between the attenuator and the amplifier.

Embodiments provide an RF (radio-frequency) feedback receiver arrangement for sensing a transmit signal property of a transmit signal of an RF transmit arrangement (or an RF transceive arrangement), wherein the RF feedback receiver arrangement comprises a normal operating phase and a calibration operating phase.

The RF feedback receiver arrangement comprises a reference signal provider configured to provide, in the normal operating phase, a first reference signal having a first reference signal frequency, and provide, in the calibration operating phase, a second reference signal having a second reference signal frequency which differs from the first reference signal frequency.

In addition, the RF feedback receiver arrangement comprises a signal property detector configured to detect the transmit property in the normal operating phase based on a combination of the first reference signal with the transmit signal or with a signal derived from the transmit signal. The transmit signal property detector is further configured to obtain, in the calibration operating phase, a calibration signal based on a combination of the second reference signal with the transmit signal or with the signal derived from the transmit signal. The calibration signal describes a disturbing portion introduced into the detected transmit signal property by the RF feedback receiver arrangement itself.

The reference signal provider may sometimes also be referred to as a "synth selector" in the following.

The signal property detector may sometimes also be referred to as a "feedback receiver" in the following.

BRIEF DESCRIPTION OF THE DRAWINGS

Embodiments of the present invention will be detailed subsequently referring to the appended drawings, in which.

DETAILED DESCRIPTION

Before embodiments will be described in detail below with reference to the accompanying figures, it shall be noted that identical elements or elements having identical functions have been provided with the same reference numerals and that repeated descriptions of said elements have been omitted. Descriptions of elements provided with the same reference numerals are therefore interchangeable.

Figure 1:
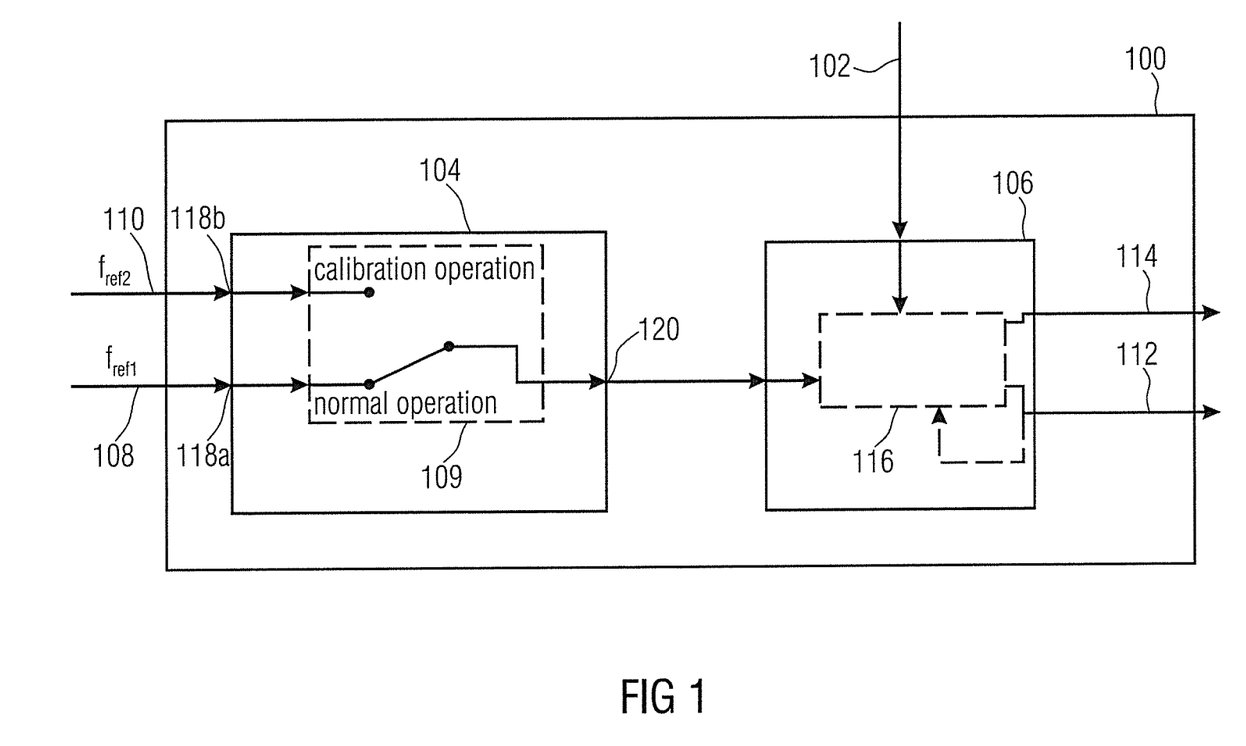
FIG. 1 shows a block diagram of an RF feedback receiver arrangement in accordance with an embodiment.

FIG. 1 shows a block diagram of an RF feedback receiver arrangement 100 for detecting a transmit signal property 114 of a transmit signal 102 of an RF transmit arrangement (not shown in FIG. 1). The RF feedback receiver arrangement 100 comprises a normal operating phase and a calibration operating phase.

In addition, the RF feedback receiver arrangement 100 comprises a reference signal provider 104 and a signal property detector 106. The reference signal provider 104 is configured to provide, in the normal operating phase, a first reference signal 108 having a first reference signal frequency $f_{ref1}$ and provide, in the calibration operating phase, a second reference signal 110 having a second reference signal frequency $f_{ref2}$, which differs from the first reference signal frequency $f_{ref1}$.

The signal property detector 106 is configured to detect, in the normal operating phase, the transmit signal property 114 based on a combination of the first reference signal 108 with the transmit signal 102 or with a signal derived from the transmit signal 102. In addition, the signal property detector 106 is configured to obtain, in the calibration operating phase, a calibration signal 112 based on a combination of the second reference signal 110 with the transmit signal 102 or with the signal derived from the transmit signal 102. The calibration signal 112 describes a disturbing portion introduced into the detected transmit signal property by the RF feedback receiver arrangement 100 itself.

The reference signal provider 104 has a first input terminal 118a for receiving the first reference signal 108, a second input terminal 118b for receiving the second reference signal 110, and an output terminal 120 for providing the first reference signal 108 in the normal operating phase and for providing the second reference signal 110 in the calibration operating phase.

In the example shown in FIG. 1, the signal property detector 106 directly combines the transmit signal 102 with the first reference signal 108 and with the second reference signal 110. In accordance with further embodiments, the signal property detector 106 may also combine a signal derived from the transmit signal 102 (for example by means of a directional coupler) with the first reference signal 108 and with the second reference signal 110 so as to obtain the transmit signal property 114 and the calibration signal 112.

The transmit signal property detected may be provided by the signal property detector 106 as a feedback signal 114, for example, in the normal operating phase. The feedback signal 114 may be provided, for example, by the RF transmit arrangement which provides the transmit signal 102.

The calibration signal 112 may be a signal internal to the RF feedback receiver arrangement 100, for example so as to perform internal calibration of the signal property detector 106, or it may also be provided, in accordance with further embodiments, at an output of the RF feedback receiver arrangement 100, for example for the RF transmit arrangement, for taking into account the calibration signal 112 in the evaluation of the detected transmit signal property 114.

The signal property detector 106 may comprise a signal combination path 116 for combining the first reference signal 108 with the transmit signal 102 and for combining the second reference signal 110 with the transmit signal 102. The signal combination path 116 may be configured to combine, in the normal operating phase, the first reference signal 108 with the transmit signal 102 so as to detect the transmit signal property 114 of the transmit signal 102. In addition, the signal combination path 116 may be configured to combine, in the calibration operating phase, the second reference signal 110 with the transmit signal 102 so as to obtain the calibration signal 112. Moreover, the signal property detector 106 may be configured to utilize, for combining the first reference signal 108 with the transmit signal 102 in the normal operating phase, the same parameters for the transmit combination path 116 as for combining the second reference signal 110 with the transmit signal 102 in the calibration operating phase.

For example, in one embodiment the transmit combination path 116 may comprise filters and/or mixers whose transfer properties are identical in the normal operating phase and in the calibration operating phase.

For example, the signal property detector 106 may be configured, for example—in a case where the first reference signal 108 is a carrier signal of the transmit signal 102—to mix the transmit signal 102 into a baseband in the normal operating phase in the combination of the transmit signal 102 with the first reference signal 108 so as to detect the transmit signal property 114 based on the transmit signal mixed into the baseband. In addition, in the combination of the second reference signal 110 with the transmit signal 102, the signal property detector 106 may mix, in the calibration operating phase, the transmit signal 102 into a band shifted to the baseband (into which the transmit signal 102 is mixed in the normal operating phase). The self-introduced disturbing portion of the RF feedback receiver arrangement 100 is mixed into the baseband in the process and is thus separated from the transmit signal 102, so that the calibration signal 112 may be obtained from the disturbing portion mixed into the baseband without the disturbing portion being overlaid by the transmit signal 102.

In other words, utilization of the two reference signals 108, 110 having the two different reference signal frequencies $f_{ref1}$, $f_{ref2}$ may achieve that in the calibration operation the disturbing portion of the RF feedback receiver arrangement 100 is mixed into a band different from the transmit signal 102 and is thus separated from the transmit signal 102 since the disturbing portion comes to lie in the baseband. The disturbing portion, in the form of the calibration signal 112, which has come to lie in the baseband may thus be calibrated toward zero and/or may be taken into account in the detection and/or the transmit signal property 114.

As may be seen from FIG. 1, the reference signal provider 104 may comprise a change-over switch 109, for example. The change-over switch 109 is configured to couple, in the normal operating phase, the first input terminal 118a to the output terminal 120 so as to provide the first reference signal 108 to the signal property detector 106, and to couple, in the calibration operating phase, the second input terminal 118b to the output terminal 120 so as to provide the second reference signal 110 to the signal property detector 106. In the normal operating phase, the second input terminal 118b is not coupled to the output terminal 120, and in the calibration operating phase, the first input terminal 118a is not coupled to the output terminal 120.

The change-over switch 109 may be realized, for example, while using one or more relays, PIN diodes or switching transistors.

For example, the change-over switch 109 may comprise a first signal switch (e.g. a first switching transistor) and a second signal switch (e.g. a second switching transistor) which is connected in a manner complementary to the former. The first signal switch may be configured to couple, in a closed state, the first input terminal 118a of the reference signal provider 104 to the output terminal 120 of the reference signal provider 104. The second signal switch may be configured to couple, in a closed state, the second input terminal 118b of the reference signal provider 104 to the output terminal 120 of the reference signal provider 104. The change-over switch 109 is configured, in the normal operating phase, to close the first signal switch and to open the second signal switch, and in the calibration operating phase to close the second signal switch and to open the first signal switch.

In summary, FIG. 1 shows a block diagram of the RF feedback receiver arrangement 100 for detecting the transmit signal property 112 of the transmit signal 102 of the RF transmit arrangement 301. The RF feedback receiver arrangement 100 is configured to detect the transmit signal property 114 in the normal operating phase based on the combination of the first reference signal 108, which has the first reference signal frequency $f_{ref1}$, with the transmit signal 102 or with the signal derived from the transmit signal. In addition, the RF feedback receiver arrangement 100 is configured to obtain the calibration signal 112 in the calibration operating phase based on the combination of the second reference signal 110, which has the second reference signal frequency $f_{ref2}$ differing from the first reference frequency $f_{ref1}$, with the transmit signal 102 or with the signal derived from the transmit signal 102. The calibration signal 112 describes the disturbing portion introduced into the detected transmit signal property 114 by the RF feedback receiver arrangement 100 itself.

Figure 2:
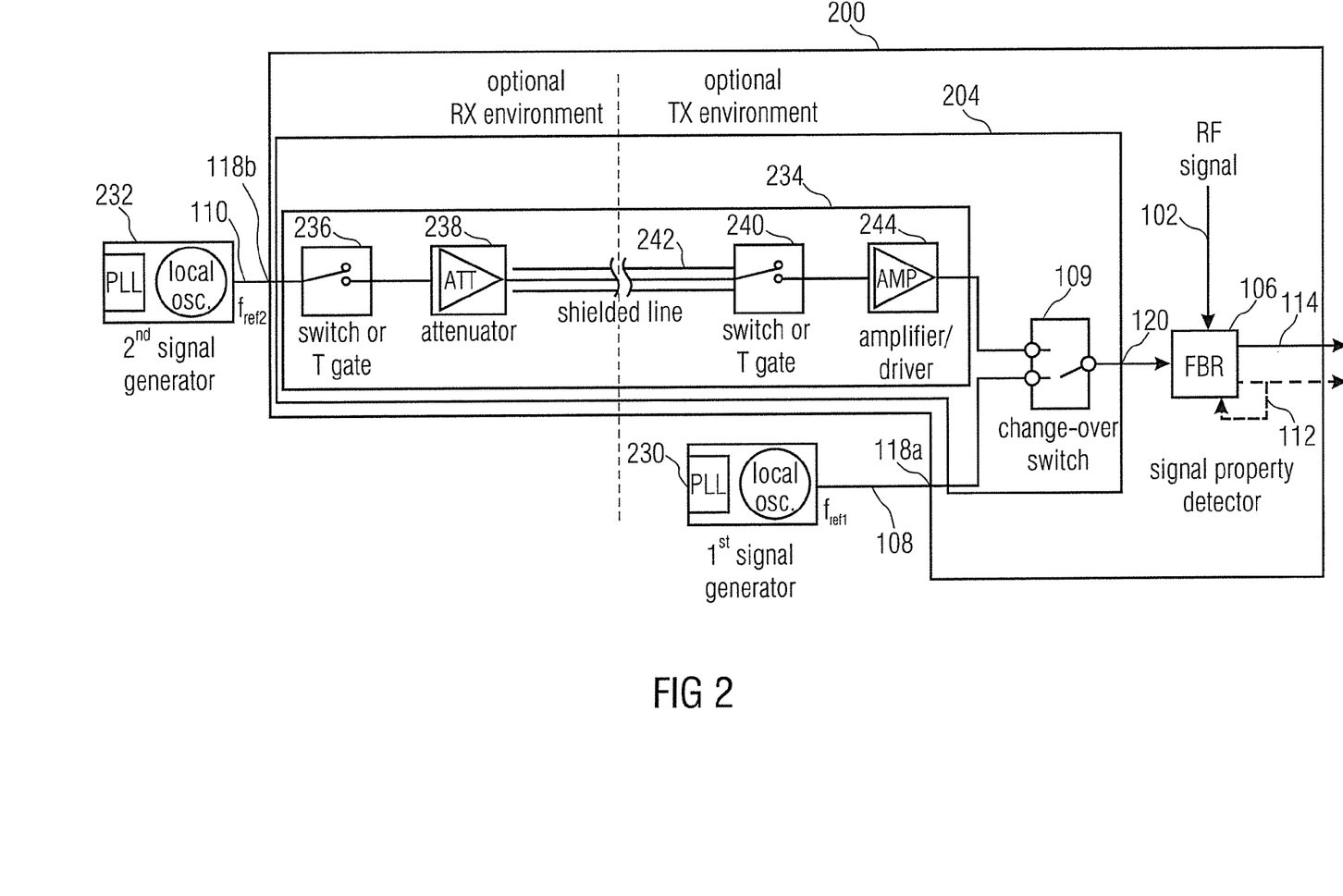
FIG. 2 shows a block diagram of an RF feedback receiver arrangement in accordance with a further embodiment.

FIG. 2 shows a block diagram of an RF feedback receiver arrangement 200 in accordance with a further embodiment. The RF feedback receiver arrangement 200 is connected to a first signal generator 230 and a second signal generator 232.

The first signal generator 230 is configured to provide the first reference signal 108 having the first reference signal frequency $f_{ref1}$ to the RF feedback receiver arrangement 200 at the first input terminal 118a. The second signal generator 232 is configured to provide the second reference signal 110 having the second reference signal frequency $f_{ref2}$ to the RF feedback receiver arrangement 200 at the second input terminal 118b.

The RF feedback receiver arrangement 200 differs from the RF feedback receiver arrangement 100 in accordance with FIG. 1 in that a reference signal provider 204 of the RF feedback receiver arrangement 200 comprises a transmission link 234 connected between the change-over switch 109 and the second input terminal 118b.

The transmission link 234 comprises a first transmission link switch 236 connected to the second input terminal 118b of the RF feedback receiver arrangement 200. In addition, the transmission link 234 comprises an attenuator 238. The transmission link switch 236 is connected between the second input terminal 118b of the RF feedback receiver arrangement 200 and the attenuator 238. In addition, the transmission link 234 comprises a second transmission link switch 240. A shielded line 242 is connected between the second transmission link switch 240 and the attenuator 238. Moreover, the transmission link 234 comprises an amplifier 244 (or a driver 244) connected between the second transmission link switch 240 and the change-over switch 109 of the reference signal provider 204.

The transmission link switches 236, 240 may be realized by relays, PIN diodes, switching transistors or transmission gates, for example.

In accordance with further embodiments, the architecture, shown in FIG. 2, of the transmission link 234 may also be varied; for example, one or more of the elements, shown in FIG. 2, of the transmission link 234 may be omitted in further embodiments.

The first transmission link switch 236 serves to decouple, in the normal operating phase (wherein the first reference signal 108 is provided at the signal property detector 106 by the reference signal provider 204), the second input terminal 118b from the change-over switch 109. In addition, the first transmission link switch 236 serves to couple, in the calibration operating phase, the second input terminal 118b to the change-over switch 109 so as to provide the second reference signal 110 to the signal property detector 106.

One has found that the second transmission link switch 240 may be utilized for separating of and/or terminating the entire shielded line 244 in the normal operating phase so as to achieve even better insulation between both reference signals 110, 108, such that in the normal operating phase, the second reference signal 110 creates no (or only minimal) disturbance in the detection of the transmit signal property 114 of the transmit signal 102. In other words, the reference signal provider 204 is configured to decouple, in the normal operating phase, the shielded line 242 from the second input terminal 118b and from the change-over switch 109 while utilizing the first transmission link switch 236 and the second transmission link switch 240.

The transmission link 234 shown in FIG. 2 serves to keep the signal small enough, in the calibration operating phase, so that overcoupling of the signal along the shielded "long" line 242 (e.g. from an RX environment to a TX environment) is minimized. For example, the first signal generator 230 may be a so-called TX synthesizer, which provides, at an RF transceive arrangement, a transmit carrier signal corresponding to the first reference signal 108. The second signal generator 232 may be a so-called RX synthesizer, which provides a receive carrier signal corresponding to the second reference signal 110. The shielded line 242 serves to transmit the second reference signal 110 provided by the RX synthesizer from the RX environment to the TX environment and to minimize undesired overcoupling of the second reference signal 110 to signals in the TX environment. As has been described, the second transmission link switch 240 may be utilized on the TX side for the purpose of improved insulation of the line so as to separate and/or terminate the entire shielded line 242 in the normal operating phase.

The reference signal 110 is attenuated by the attenuator 238 upstream from the shielded line 242, so that only an attenuated version of the second reference signal 110 is transmitted via the shielded line 242. By means of the amplifier 242, or driver 242, the attenuated signal may then again be made to have a useful power for the signal property detector 106. One has found that the signal property detector 106 (unlike mixers in the signal field) requires no particularly high-quality mixed signal, therefore the first reference signal 108 and the second reference signal 110 (TX and RX synthesizer signal) may be separated, at the critical point where they coincide (the change-over switch 109 or "synth selector" 109), by the design-related measures shown in FIG. 2 such that crosstalk effects will not or only marginally degrade the performance of the overall system. In other words, one has found that a signal-to-noise ratio of the second reference signal 110 is not important, or plays only a minor role, and that therefore relatively high attenuation by the attenuator 238 and high amplification by the amplifier 244 are possible.

Figure 3:
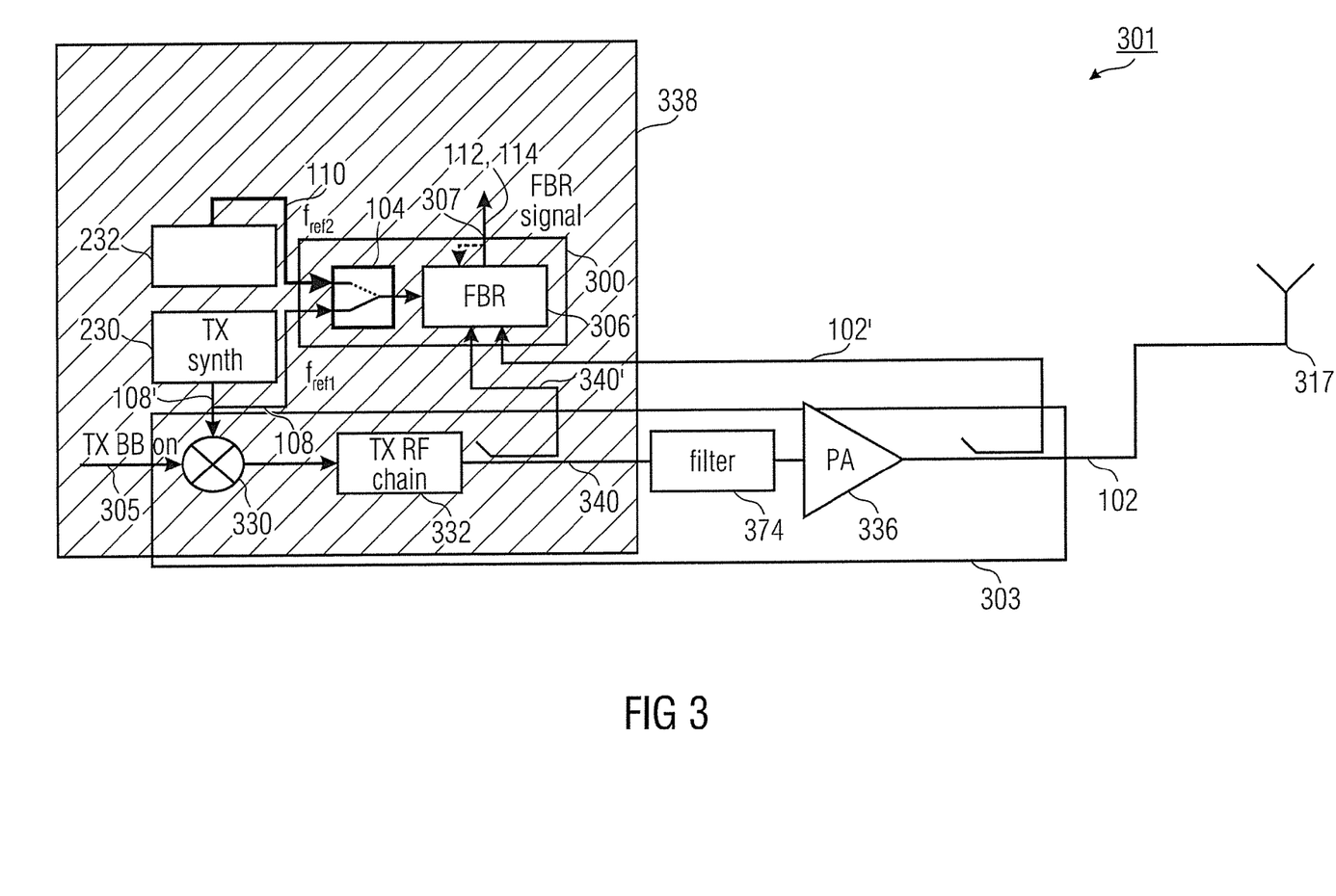
FIG. 3 shows a block diagram of an RF transmit arrangement in accordance with an embodiment.

FIG. 3 shows a block diagram of an RF transmit arrangement 301 in accordance with an embodiment. The RF transmit arrangement 301 comprises an RF feedback receiver arrangement 300. In terms of its functionality, the RF feedback receiver arrangement 300 may correspond, e.g., to the RF feedback receiver arrangement 100 in accordance with FIG. 1 or to the RF feedback receiver arrangement 200 in accordance with FIG. 2. In addition, the RF feedback receiver arrangement 300 may also comprise additional (optional) features, which will be described below. The RF feedback receiver arrangement 300 may therefore also be operated in an RF transmit arrangement differing from the RF transmit arrangement 301 so as to detect a signal property of a transmit signal of the RF transmit arrangement. Moreover, the RF transmit arrangement 301 comprises a first signal generator 230 for generating a transmit carrier signal 108' having a transmit carrier frequency and for generating the first reference signal 108. In this context, the first reference signal 108 is based on the transmit carrier signal 108'. In the exemplary example shown in FIG. 3, the transmit carrier signal 108' is identical with the first reference signal 108. The first signal generator 230 is a so-called TX synthesizer, for example.

In addition, the RF transmit arrangement 301 comprises a second signal generator 232 for generating the second reference signal 110. Moreover, the RF transmit arrangement 301 comprises a transmit path 303. The transmit path 303 is configured to provide the transmit signal 102 based on a combination of the transmit carrier signal 110' with a transmit base signal 305. In addition, the transmit path 303 is configured to provide a signal 102' derived from the transmit signal at a signal property detector 306 of the RF feedback receiver arrangement 300. The signal 102' derived from the transmit signal 102 may be provided by using a directional coupler or a power detector of the transmit path 303, for example.

The transmit path 303 comprises a mixer 330. The mixer 330 is configured to combine the baseband signal 305 with the transmit carrier signal 108' so as to upmix the transmit baseband signal 305 to the transmit carrier frequency. In addition, the transmit path 303 has a TX RF chain 332, a filter 374 and a power amplifier (PA) 336. The TX RF chain 332, the filter 374 and the power amplifier 336 are configured to provide the transmit signal 102 based on the transmit baseband signal 305 upmixed to the transmitter carrier frequency.

The signal property detector 306 is configured to detect the transmit signal property 114 in the normal operating phase based on a combination of the first reference signal 108 with the signal 102' derived from the transmit signal, and to provide it, for example, as a feedback signal 114 (or FBR signal 114) to the RF feedback receiver arrangement 300 at an output 307. In addition, the signal property detector 306 is configured to obtain, in the calibration operating phase, the calibration signal 112 based on a combination of the second reference signal 110 with the signal 102' derived from the transmit signal 102. The calibration signal 112 describes the disturbing portion introduced into the detected transmit signal property 114 by the RF feedback receiver arrangement 300 itself. The signal property detector 306 may be configured to provide the calibration signal in the calibration operating phase at the output 307 and/or to evaluate the calibration signal 112 so as to perform a calibration for reducing the portion that is self-introduced. For example, the signal property detector 306 may calibrate the disturbing portion to 0 such that the disturbing portion will be compensated for in the detected transmit signal property 114 following the calibration.

In one embodiment this signal property detector 306 is configured to detect a power of the transmit signal 102 as the transmit signal property 114 and provide it as the feedback signal 114. The transmit signal 102 may be supplied from the transmit path 303 directly onto an antenna 317 or an antenna switch (not shown in FIG. 3) of the RF transmit arrangement 301. The RF feedback receiver arrangement 300 may therefore be utilized for determining, in the normal operating phase, a power of the transmit signal 102 at the antenna 317. A disturbing portion introduced into the detected transmit signal property 114 by the RF feedback receiver arrangement 300 itself may be detected as the calibration signal 112 by the signal property detector 306 in the calibration phase. The calibration signal 112 may therefore be taken into account for determining the transmit signal property 114 of the transmit signal 102 so as to compensate for this disturbing portion.

The concept shown in FIG. 3 allows that the signal property detector 306 (or the feedback receiver) may be calibrated at any time and with precision independently of the transmit signal 102 (or TX signal 102) which is present. It has been found that if a frequency (e.g. the second reference signal frequency $f_{ref2}$) which is different from the transmit carrier frequency (or TX frequency) is used during the termination process, the transmit signal 102 will no longer fall into a passband of the signal property detector 306, and (all of the) influences of the useful signal (of the transmit signal 102) on the calibration result (on the calibration signal 112) will be ruled out as a result.

A solution that is efficient in terms of circuit engineering is utilization of a mixed signal having a transmit signal carrier frequency (TX carrier frequency) that is divided or multiplied by an integer, it being assumed that the potentially disturbing intermodulation products are attenuated in the level to such an extent that they will no longer contribute. In other words, the first signal generator may also provide the transmit carrier signal 108' to the second signal generator 232, which comprises a divisor or multiplier to divide or to modify the transmit carrier signal 108' so as to obtain the second reference signal 110 having the second reference signal frequency $f_{ref2}$.

In accordance with further embodiments, a so-called RX synthesizer may also be used as the second signal generator 232 during the calibration (if it is available at the time of calibration, which is usually the case, however).

By utilizing an RX synthesizer as the second signal generator 232 and a TX synthesizer as the first signal generator 230, two signals may be used as reference signals for the signal property detector 306, which are anyway available in a typical transceive arrangement, and in modern communication systems (such as UMTS or LTE, for example) have different carrier frequencies. In addition, said carrier frequencies are typically sufficiently far apart so that the transmit signal 102 or the signal 102' derived from the transmit signal is not mixed into the passband of the signal property detector 306 in the calibration operating phase, but are nevertheless close enough to each other so that the operating frequency of the signal property detector 306 in the calibration operating phase is still close enough to the operating frequency in the normal operating phase so that the properties of the signal property detector 306 (and, thus, the disturbing portion introduced) do not differ (or differ only marginally) in the normal operating phase and in the calibration operating phase.

By means of the concept shown in FIG. 3, of all of the contributions to the parasitic DC signal portion, the most important ones can be minimized; for example, those portions that arise in the baseband of the receive path as well as effects such as DC offset may be eliminated by a non-ideal 90° angle between the I and Q paths. In addition, further embodiments may contain portions that also eliminate parasitic effects, such as self-mixing of a receive signal and a mixed signal.

The concept shown in FIG. 3 may also be used with any zero IF (intermediate-frequency) receiver so as to separate the useful receive signal from the disturbing signal, used as a measured quantity, on account of imbalances in the receive path (which furthermore result in a DC offset) during the calibration. It is even possible to specifically block out other signal portions (e.g. so-called "blocker" disturbing signals spectrally located close to the useful signal) for specific application-related reasons.

As is shown in FIG. 3, the TX RF (radio-frequency) signal (i.e. the transmit signal 102) to be evaluated may be coupled out both within a transmitter 300 of the RF transmitter arrangement 301 and downstream from the power amplifier 336, and may be supplied to the signal property detector 306. In other words, the transmit path 303 may further provide a non-amplified version 340 of the transmit signal 102 and, as is shown in FIG. 3, it may provide a derived version 340' of the non-amplified transmit signal 340 to the signal property detector 306.

The signal property detector 306 may be configured to combine, in the normal operating phase, the first reference signal 108 both with the signal 340' derived from the non-amplified version 340 and with the signal 102' derived from the transmit signal 102 so as to detect the transmit signal property 114. Moreover, the signal property detector 306 may be configured to combine, in the calibration operating phase, the second reference signal 110 both with the signal 340' derived from the non-amplified version 340 and with the signal 102' derived from the transmit signal 102 so as to obtain the calibration signal 112.

In the concept shown in FIG. 3, calibration of the signal property detector 306 is therefore performed in a manner that is frequency-shifted relative to the operation. If an RX synthesizer signal (e.g. a receive carrier signal is used as the second reference signal 110) is used for downmixing in the signal property detector 306, the operating state of the entire signal property detector 306 will typically undergo only a small change, so that the result is very well applicable to the standard operating condition (with the TX synthesizer mixed signal and/or the transmit carrier signal 108').

By means of this principle, direct disturbing signal portions in calibration (which disturbing signal portions may overlay or even exceed, in terms of power, the signal arising from the parasitic effects, for example due to the finite attenuation of the typically power-efficient TX signal), and thus one allows a continuous, as it were, calibration of the signal property detector 306 during continuous TX operation, or transmit operation. In other words, the RF feedback receiver arrangement 300 is configured to switch from the normal operating phase to the calibration operating phase in the event of a continually present transmit signal 102.

In addition, the RF feedback receiver arrangement 300 is configured to switch, in a temporally successive manner, from the normal operating phase to the calibration operating phase and from the calibration operating phase to the normal operating phase. Therefore, it is typically not the case that the RF feedback receiver arrangement 300 is both in the normal operating phase and in the calibration operating phase. In other words, the reference signal provider 104 is configured such that at any point in time, either the first reference signal 108 or the second reference signal 110 is provided at its output (apart from switching times).

Due to the continuous calibration of the signal property detector 306 during transmit operation, both the effects of miscalibration caused by TX interspersal and the lack of accuracy caused by drift effects in the event of one-time calibration may be avoided.

In accordance with some embodiments, the first signal generator 230 and the second signal generator 232 may be configured such that the first reference signal frequency $f_{ref1}$ deviates from the second reference signal frequency $f_{ref2}$ by a maximum of 2%, a maximum of 5%, a maximum of 10%, a maximum of 20%, or a maximum of 50%.

In addition, the first signal generator 230 and the second signal generator 232 may be configured such that the first reference signal frequency $f_{ref1}$ and the second reference signal frequency $f_{ref2}$ range from 700 MHz to 2700 MHz. For example, the signal generators 230, 232 may generate UMTS (Universal Mobile Telecommunications System) or LTE (Long Term Evolution) transmit carrier signals or UMTS or LTE receive carrier signals.

For example, the first signal generator 230 may be configured to provide the first reference signal 108 as a UMTS transmit carrier signal within a UMTS transmit carrier frequency range or to provide the first reference signal 108 as an LTE transmit carrier signal within an LTE transmit carrier frequency range.

The second signal generator 232 may be configured to provide the second reference signal 110 as a UMTS receive carrier signal within a UMTS receive carrier frequency range or to provide the second reference signal 110 as an LTE receive carrier signal within an LTE receive carrier frequency range.

As was already explained above, the RF transmit arrangement 301 may further be configured to provide the transmit signal 102 both in the normal operating phase and in the calibration operating phase and to switch from the normal operating phase to the calibration operating phase and from the calibration operating phase to the normal operating phase irrespective of whether or not the transmit signal 102 is provided. In other words, calibration of the transmit signal property detector 306 may be effected despite continuous transmit operation, as may be useful for UMTS or LTE, for example.

Embodiments therefore enable calibration of the signal property detector 306 despite continuous transmit operation.

In addition, the RF transmit arrangement 301 may be configured to take into account the detected transmit signal property 114 in providing the transmit signal 102 and to evaluate the calibration signal 112 so as to take into account a result of the evaluation of the calibration signal 112 in providing the transmit signal 102. For example, an offset error of the signal property detector 306 may be taken into account in providing the transmit signal 102, for example by adapting the amplification for the transmit signal 102.

In other words, the RF transmit arrangement 301 may correct the detected transmit signal property 114 based on the result of the evaluation of the calibration signal 112.

Figure 4:
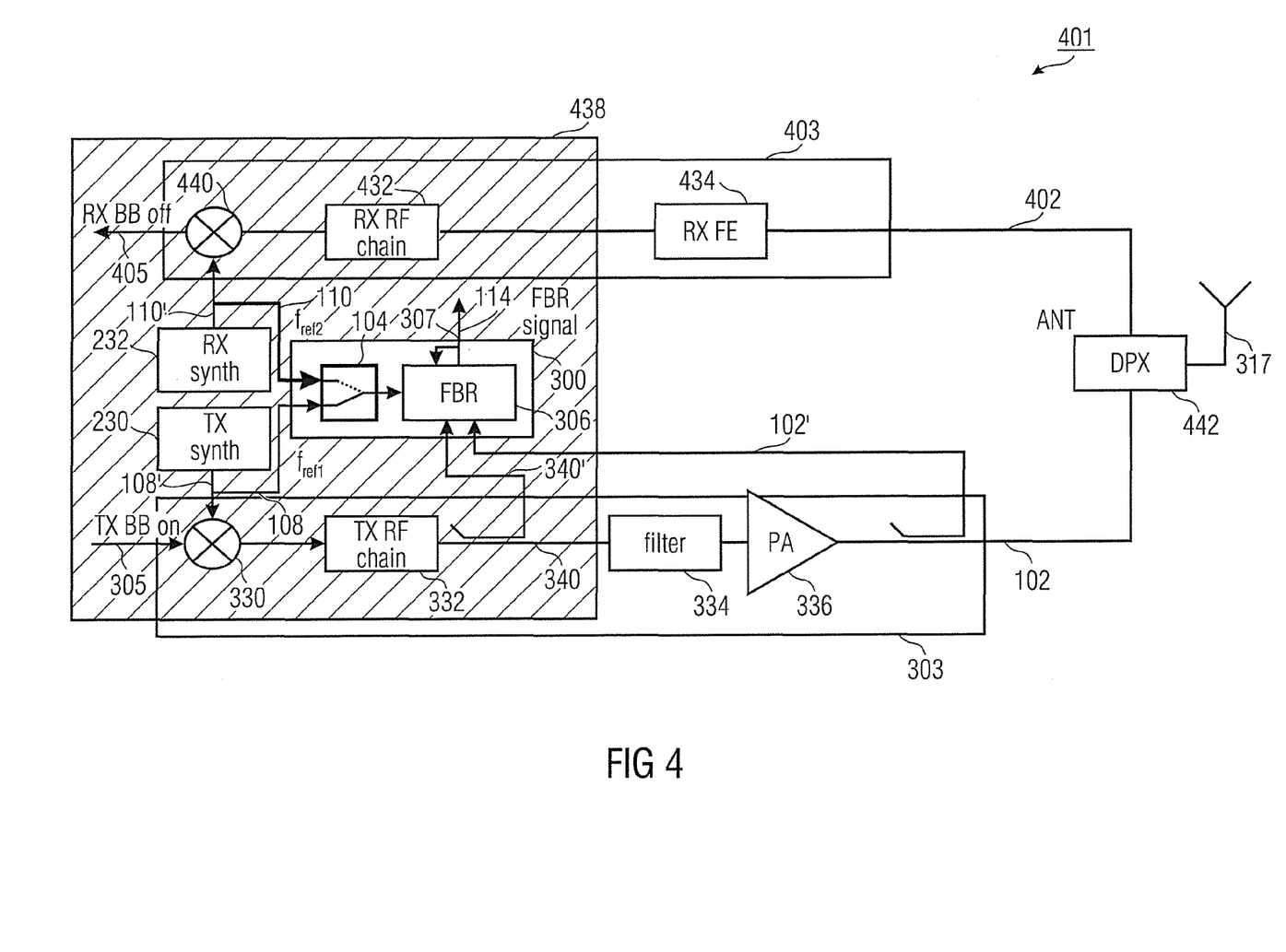
FIG. 4 shows a block diagram of an RF transceive arrangement in accordance with an embodiment.

FIG. 4 shows an RF transceiver arrangement 401 in accordance with a further embodiment. The RF transceiver arrangement 401 is configured to receive a receive signal 401 and to provide a transmit signal 102. The RF transceiver arrangement 401 differs from the RF transmit arrangement 301 in accordance with FIG. 3 in that it further comprises a receive path 403 for providing a receive baseband signal 405. In addition, the second signal generator 232 is configured to generate a receive carrier signal 110' having a receive carrier frequency and the second reference signal 110. The second reference signal 110 is based on the receive carrier signal 110'. In the example shown in FIG. 4, the second reference signal 110 corresponds to the receive carrier signal 110'. The transmit path 403 comprises a receive filter unit 434 (RX FE) and an RX RF chain 432. In addition, the receive path comprises a mixer 440. The receive path 403 is configured to obtain the receive baseband signal 405 on the basis of a combination of the receive signal 402 or of a signal derived therefrom (e.g. a signal processed by the RX filter unit 434 and the RX RF chain 432) with the receive carrier signal 110'. To this end, the mixer 440 downmixes the receive signal 402, or the signal derived therefrom, using the receive carrier frequency 110' so as to obtain the receive signal 402 in the baseband as the receive baseband 405. Moreover, the RF transceive arrangement 401 comprises a duplexer 442 so as to both receive the receive signal 402 at the antenna 317 and to provide the transmit signal 102 at the antenna 317.

The duplexer 442 is configured to separate a receive path of the RF transceiver arrangement 401 from a transmit path of the RF transceiver arrangement 401. For example, the duplexer 442 may comprise a first filter that is connected between the antenna 317 and the transmit path 303 and whose passband is adapted to a frequency range of the transmit signal 102. Moreover, the duplexer 442 may comprise a second filter that is connected between the antenna 317 and the receive path 403 and whose passband is adapted to a frequency range of the receive signal 402.

In accordance with further embodiments, the duplexer 442 may also be connected to an antenna switch of the RF transceive arrangement 401 rather than to the antenna 317, said antenna switch being configured to switch between different communication bands (e.g. between different UMTS or LTE bands) of the RF transceive arrangement 401. For each supported communication band, the RF transceive arrangement 401 may comprise an RF feedback receiver arrangement, a transmit path, a receive path and a duplexer.

The TX RF (radio-frequency) signal 102 to be evaluated is coupled out both within a transceiver 438 of the RF transceiver arrangement 401 and downstream from the power amplifier 336 and is supplied to the signal property detector 306 (the feedback receiver). The signal property detector 306 mixes the signal to be evaluated (that is, e.g., the signal 102' derived from the transmit signal 102 and/or the signal 340' derived from the non-amplified version 340) with the signal of the TX synthesizer (with the first reference signal 108) of the first signal generator 230—normal operating phase) or that of the RX synthesizer (the second reference signal 110 of the second signal generator 232—calibration operating phase) into the baseband position. In case of the normal operating phase, the TX signal (the signal 102' derived from the transmit signal 102 or the signal 340' derived from the non-amplified version 340) comes to lie in the baseband and may be processed further appropriately (as the detected transmit signal property in the feedback signal 114, or FBR signal 114). During the calibration phase, the TX signal (the signal 102' derived from the transmit signal 102 and/or the signal 340' derived from the non-amplified version 340) is not mixed into the baseband since the TX frequency and the RX frequency (transmit carrier frequency and receive carrier frequency) for modern mobile radio standards (such as LTE or UMTS, for example) are different from each other. The signals dominating the parasitic DC component (or the disturbing portion of the signal property detector 306 itself continue (continues) to lie in the baseband and thus can be calibrated toward zero.

In principle, calibration might be performed prior to each TX signal measurement (prior to each detection of the transmit signal property 114) or might be performed only when specific framework conditions are met (for example, since the latest calibration, if a certain temperature delta is detected at the chip, or if a specific time period has been exceeded).

In a further embodiment, a transmit carrier frequency divided by two or multiplied by two might be used, for example. For example, if a signal generator or a sinus generator in the TX (in the transmit environment) runs at double the transmit carrier frequency, a frequency divider (e.g. of the reference signal provider 109) might divide the mixed signal of the signal property detector 306 by a further factor of two for the calibration, which might lead to inaccuracies in the result, however, since in this case the operating frequency of the signal property detector 306 is far from the standard operating condition.

In accordance with further embodiments, any other mixing frequency which is different from the transmitter carrier frequency and is generated in any manner possible may be used for the signal property detector 306 (as the second reference signal frequency) so as to apply the principle described here.

Some selected aspects of embodiments will be summarized in the following.

In embodiments, the generated transmit signal 102 is immediately demodulated again within the transmitter 338 or the transceiver 438, and the information about same which has thus been obtained is used for various purposes (e.g. for correcting the transmit power). To save hardware expenditure, the TX modulation signal (the transmit carrier signal 108') is used for demodulating the receive signal (the transmit signal provided at the signal property detector 306, or the signal derived therefrom). In accordance with further embodiments, however, a further synthesizer (for example a further signal generator) may be employed which follows the current transmit carrier frequency accurately or as accurately as possible. To increase the accuracy of the power control over the entire transmit path 303 (i.e. including external components such as filter 334 or the power amplifier 336) it is alternatively or additionally possible to tap the transmit signal 102 as close as possible to the (transmitter) antenna 317 (e.g. downstream from the power amplifier 336), to supply it to the signal property detector 306 (the so-called feedback receiver) and to evaluate it.

In conventional systems, the problem arises that a utilized highpass filter may, on the one hand, be broad-band in order to enable accurate measurement of the transmit signal, but on the other hand, possibly significant portions of the signal may be filtered away precisely because of this, and the measurement accuracy is thus reduced. If this highpass is dispensed with, drift effects will no longer enable accurate measurements, especially for a small transmit signal. In addition, in such conventional systems the transmit signal is typically present, during calibration, at a conventional power detection circuit, which will distort the calibration result especially for high signal strengths. However, it is possible in embodiments for the transmit signal to be present, in the calibration, at the transmit signal property detector 306, but that utilization of two different reference signals in the normal operating phase and the calibration operating phase enables the transmit signal to be mixed, in the calibration operating phase, into a frequency range which is outside the passband of the signal property detector and therefore does not distort the calibration signal.

Embodiments provide a concept which enables calibration of a signal property detector for detecting a property of a transmit signal irrespective of a transmit signal that may be present.

Embodiments provide a concept for accurate compensation for a DC offset in receivers.

In modern zero IF transceivers, a method is used—both in the transmit (TX) and in the receive (RX) pass—for suppressing the constant offset arising in this architecture (which constant offset is expressed in TX as a sinus tone with exactly the modulation frequency, in RX as a signal at 0 Hz) as far as possible. Particularly in RX, the problem arises that said disturbing portion may overlay with the useful signal portion. This will degrade the signal quality of the received useful signal and in extreme cases may also result in saturation effects in the receive path—e.g. if the parasitic portion clearly exceeds the useful signal. The same may happen in TX—however, in this case the disturbance typically is only of such nature that the useful signal may be perfectly reconstructed.

In RX (in the receive path) there is a common method of separating the receive signal from the receive path and to subsequently calibrate the direct component (DC component) of the receive signal, which is now purely parasitic and has been downmixed into the baseband, to a small value or, in the ideal case, to zero by means of an algorithm. Since the operating point that has been found in this manner may shift during operation of the receiver, a highpass filter having a very low edge frequency is commonly switched into the baseband receive path to achieve as high DC suppression as possible. This is useful for radio standards enabling continuous RX operation, e.g. UMTS or LTE. In the case of a TDMA (Time Division Multiple Access) standard it is also possible, in principle, to perform the DC offset calibration in the "receive pauses" since a significant drift of the operating point within a receive pulse, which after all is relatively short, is unlikely, or its effect is negligible. However, the highpass filtering mentioned has an effect on the signal received—the portions below or near the filter edge frequency are distorted and/or suppressed. This may degrade the performance of the entire system.

Embodiments enable circumventing the above-mentioned problems in the conventional transceivers by utilizing two different reference signals having different reference signal frequencies in the case of calibration operation and in the case of normal operation of an RF feedback receiver arrangement.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. An RF feedback receiver arrangement for detecting a transmit signal property of a transmit signal of an RF transmit arrangement, the RF feedback receiver arrangement comprising a normal operating phase and a calibration operating phase, comprising:
 a reference signal provider configured to provide, in the normal operating phase, a first reference signal comprising a first reference signal frequency and provide, in the calibration operating phase, a second reference signal comprising a second reference signal frequency, which differs from the first reference signal frequency; and
 a signal property detector configured to detect, in the normal operating phase, the transmit signal property based on a combination of the first reference signal with the transmit signal or with a signal derived from the transmit signal; and
 the signal property detector further configured to acquire, in the calibration operating phase, a calibration signal based on a combination of the second reference signal with the transmit signal or with the signal derived from the transmit signal, wherein the calibration signal describes a disturbing portion introduced into the detected transmit signal property by the RF feedback receiver arrangement itself.

2. The RF feedback receiver arrangement as claimed in claim 1, wherein the RF feedback receiver arrangement is configured to switch, in a temporally successive manner, from the normal operating phase to the calibration operating phase and from the calibration operating phase to the normal operating phase.

3. The RF feedback receiver arrangement as claimed in claim 1, wherein the RF feedback receiver arrangement is configured to switch from the normal operating phase to the calibration operating phase in the event of a continually present transmit signal.

4. The RF feedback receiver arrangement as claimed in claim 1,
 wherein the signal property detector comprises a shared signal combination path configured to combine the first reference signal with the transmit signal or with the signal derived from the transmit signal and combine the second reference signal with the transmit signal or with the signal derived from the transmit signal; and
 wherein the signal property detector is configured to utilize, for combining the first reference signal with the transmit signal or with the signal derived from the transmit signal in the normal operating phase, a same one or more parameters for the signal combination path as for combining the second reference signal with the transmit signal or with the signal derived from the transmit signal in the calibration operating phase.

5. The RF feedback receiver arrangement as claimed in claim 1, wherein the signal property detector is configured—in a case where the first reference signal is a carrier signal of the transmit signal—to mix the transmit signal or the signal derived from the transmit signal with the first reference signal into a baseband, in the normal operating phase, based on the combination of the transmit signal or of the signal derived from the transmit signal, so as to detect the transmit signal property based on the transmit signal mixed into the baseband or on the basis of the signal derived from the transmit signal and mixed into the baseband, and configured to mix the transmit signal or the signal derived from the transmit signal, in the calibration operating phase, into a band shifted to the baseband in the combination of the second reference signal with the transmit signal or with the signal derived from the transmit signal, and to mix the self-introduced disturbing portion into the baseband so as to acquire the calibration signal from the disturbing portion mixed into the baseband.

6. The RF feedback receiver arrangement as claimed in claim 1, wherein the signal property detector is configured—in a case where the first reference signal is a transmit carrier signal for a UMTS transmit band or an LTE transmit band and the second reference signal is a receive carrier signal for a UMTS receive band or an LTE receive band—to mix the transmit signal or the signal derived from the transmit signal into a baseband in the normal operating phase, and in the calibration operating phase to mix the transmit signal or the signal derived from the transmit signal into a band shifted to the baseband, a baseband filter of the signal property detector being configured to suppress the transmit signal or the signal derived from the transmit signal in the band shifted to the baseband by at least 90% to reduce a proportion the transmit signal comprises in the calibration signal.

7. The RF feedback receiver arrangement as claimed in claim 1,
 wherein the reference signal provider comprises a first input terminal configured to receive the first reference signal, a second input terminal configured to receive the second reference signal, and an output terminal configured to provide the first reference signal and for providing the second reference signal; and
 wherein the reference signal provider comprises a change-over switch configured to couple, in the normal operating phase, the first input terminal to the output terminal and couple, in the calibration operating phase, the second input terminal to the output terminal.

8. The RF feedback receiver arrangement as claimed in claim 7, wherein the reference signal provider comprises a transmission path connected between the change-over switch and the second input terminal, wherein the transmission path comprises a first transmission path switch to decouple the second input terminal from the change-over switch in the normal operating phase.

9. The RF feedback receiver arrangement as claimed in claim 8,
- wherein the transmission path of the reference signal provider further comprises a second transmission path switch and a shielded line, the shielded line being connected between the first transmission path switch and the second transmission path switch; and
- wherein the reference signal provider is configured to decouple the shielded line from the second input terminal and from the change-over switch in the normal operating phase using the first transmission path switch and the second transmission path switch.

10. The RF feedback receiver arrangement as claimed in claim 7,
- wherein the reference signal provider further comprises a transmission path connected between the second input terminal and the change-over switch; and
- wherein the transmission path comprises an attenuator, an amplifier and a shielded line connected between the attenuator and the amplifier.

11. The RF feedback receiver arrangement as claimed in claim 7,
- wherein the change-over switch of the reference signal provider comprises a first signal switch and a second signal switch connected to complement the former, said first signal switch being configured to couple, in a closed state, the first input terminal of the reference signal provider to the output terminal of the reference signal provider, and the second signal switch being configured to couple, in a closed state, the second input terminal of the reference signal provider to the output terminal of the reference signal provider; and
- wherein the change-over switch is configured, in the normal operating phase, to close the first signal switch and to open the second signal switch, and in the calibration operating phase to close the second signal switch and to open the first signal switch.

12. The RF feedback receiver arrangement as claimed in claim 1, wherein the signal property detector is configured to provide the detected transmit signal property at an output of the signal property detector as a feedback signal.

13. The RF feedback receiver arrangement as claimed in claim 12, wherein the signal property detector is configured to provide, in the normal operating phase, the feedback signal at the output of the transmit signal property detector and to provide, in the calibration operating phase, the calibration signal at the output of the transmit signal property detector.

14. The RF feedback receiver arrangement as claimed in claim 1, wherein the signal property detector is configured to evaluate the calibration signal to perform calibration for reducing the self-introduced disturbing portion.

15. The RF feedback receiver arrangement as claimed in claim 1, wherein the signal property detector is configured to detect a power of the transmit signal as the transmit signal property.

16. The RF feedback receiver arrangement as claimed in claim 1, wherein the signal property detector is configured to combine, in the normal operating phase, the first reference signal with a non-amplified version of the transmit signal or with a signal derived from the non-amplified version and to combine it with the transmit signal or the signal derived from the transmit signal so as to detect the transmit signal property, and to combine, in the calibration operating phase, the second reference signal with the non-amplified version of the transmit signal or with the signal derived from the non-amplified version and with the transmit signal or with the signal derived from the transmit signal so as to acquire the calibration signal.

17. An RF transmit arrangement for providing a transmit signal, comprising:
- an RF feedback receiver arrangement configured to detect a transmit signal property of a transmit signal of an RF transmit arrangement, the RF feedback receiver arrangement comprising a normal operating phase and a calibration operating phase, comprising:
  - a reference signal provider configured to provide, in the normal operating phase, a first reference signal comprising a first reference signal frequency and to provide, in the calibration operating phase, a second reference signal comprising a second reference signal frequency, which differs from the first reference signal frequency; and
  - a signal property detector configured to detect, in the normal operating phase, the transmit signal property based on a combination of the first reference signal with the transmit signal or with a signal derived from the transmit signal; and
  - the signal property detector further being configured to acquire, in the calibration operating phase, a calibration signal based on a combination of the second reference signal with the transmit signal or with the signal derived from the transmit signal, wherein the calibration signal describes a disturbing portion introduced into the detected transmit signal property by the RF feedback receiver arrangement itself;
  - a first signal generator configured to generate a transmit carrier signal comprising a transmit carrier frequency and generate the first reference signal, wherein the first reference signal is based on the transmit carrier signal;
  - a second signal generator configured to generate the second reference signal; and
- a transmit path configured to provide the transmit signal based on a combination of the transmit carrier signal with a transmit baseband signal, the transmit path being configured to provide the transmit signal or the signal derived from the transmit signal at the signal property detector of the RF feedback receiver arrangement.

18. An RF transceiver arrangement for receiving a receive signal and for providing a transmit signal, comprising:
- an RF feedback receiver arrangement configured to detect a transmit signal property of a transmit signal of an RF transmit arrangement, the RF feedback receiver arrangement comprising a normal operating phase and a calibration operating phase, comprising:
  - a reference signal provider configured to provide, in the normal operating phase, a first reference signal comprising a first reference signal frequency and provide, in the calibration operating phase, a second reference signal comprising a second reference signal frequency, which differs from the first reference signal frequency; and
  - a signal property detector configured to detect, in the normal operating phase, the transmit signal property based on a combination of the first reference signal with the transmit signal or with a signal derived from the transmit signal; and
  - the signal property detector further being configured to acquire, in the calibration operating phase, a calibration signal based on a combination of the second reference signal with the transmit signal or with the signal derived from the transmit signal, the calibration signal describing a disturbing portion introduced into the detected transmit signal property by the RF feedback receiver arrangement itself;

a first signal generator configured to generate a transmit carrier signal comprising a transmit carrier frequency and configured to generate the first reference signal, wherein the first reference signal is based on the transmit carrier signal;

a second signal generator configured to generate a receive carrier signal comprising a receive carrier frequency and generate the second reference signal, wherein the second reference signal is based on the receive carrier signal;

a transmit path configured to provide the transmit signal based on a combination of the transmit carrier signal with a transmit baseband signal, the transmit path being configured to provide the transmit signal or the signal derived from the transmit signal at the signal property detector of the feedback receiver arrangement; and a receive path configured to provide a receive baseband signal based on a combination of the receive signal or of a signal derived therefrom with the receive carrier signal.

19. The RF transceiver arrangement as claimed in claim 18, wherein the first signal generator and the second signal generator are configured such that the first reference signal frequency deviates from the second reference signal frequency by a maximum of 10%.

20. The RF transceiver arrangement as claimed in claim 18, wherein the first signal generator and the second signal generator are configured such that the first reference signal frequency and the second reference signal frequency range from 700 MHz to 2700 MHz.

21. The RF transceive arrangement as claimed in claim 18, wherein the first signal generator is configured to provide the first reference signal as a UMTS transmit carrier signal within a UMTS transmit carrier frequency range or to provide a first reference signal as an LTE transmit carrier signal within an LTE transmit carrier frequency, range; and wherein the second signal generator is configured to provide the second reference signal as a UMTS receive carrier signal within a UMTS receive carrier frequency range or to provide the second reference signal as an LTE receive carrier signal within an LTE receive carrier range.

22. The RF transceiver arrangement as claimed in claim 18, wherein the RF transmit arrangement or the RF transceiver arrangement is configured to provide the transmit signal both in the normal operating phase and in the calibration operating phase and switch from the normal operating phase to the calibration operating phase and from the calibration operating phase to the normal operating phase irrespective of whether or not the transmit signal is provided.

23. The RF transceiver arrangement as claimed in claim 18, wherein the RF transmit arrangement or the RF transceiver arrangement is configured to take into account the detected signal property in providing the transmit signal and to evaluate the calibration signal so as to take into account a result of the evaluation of the calibration signal in providing the transmit signal.

24. The RF transceiver arrangement as claimed in claim 23, wherein the RF transceiver arrangement is configured to correct the detected transmit signal property based on the result of the evaluation of the calibration signal.

25. The RF transceiver arrangement as claimed in claim 18, wherein the transmit path is configured to further provide the RF feedback receiver arrangement with a non-amplified version of the transmit signal or with a signal derived from the non-amplified version.

26. An RF feedback receiver arrangement for detecting a transmit signal property of a transmit signal of an RF transmit arrangement, the RF feedback receiver arrangement being configured to detect, in a normal operating phase, the transmit signal property based on a combination of a first reference signal comprising a first reference signal frequency with the transmit signal or with a signal derived from the transmit signal, and to acquire, in a calibration operating phase, a calibration signal based on a combination of a second reference signal comprising a second reference signal frequency which differs from the first reference signal frequency with the transmit signal or with the signal derived from the transmit signal, wherein the calibration signal describes a disturbing portion introduced into the detected transmit signal property by the RF feedback receiver arrangement itself.

27. An RF feedback receiver arrangement for detecting a transmit signal property of a transmit signal of an RF transmit arrangement, the RF feedback receiver arrangement comprising a normal operating phase and a calibration operating phase, comprising:

a reference signal provider configured to provide, in the normal operating phase, a first reference signal comprising a first reference signal frequency and provide, in the calibration operating phase, a second reference signal comprising a second reference signal frequency, which differs from the first reference signal frequency; and a signal property detector configured to detect, in the normal operating phase, the transmit signal property based on a combination of the first reference signal with the transmit signal or with a signal derived from the transmit signal;

the signal property detector further being configured to acquire, in the calibration operating phase, a calibration signal based on a combination of the second reference signal with the transmit signal or with the signal derived from the transmit signal, wherein the calibration signal describes a disturbing portion introduced into the detected transmit signal property by the RF feedback receiver arrangement itself;

wherein the signal property detector is configured—in a case where the first reference signal is a carrier signal of the transmit signal—to mix the transmit signal or the signal derived from the transmit signal with the first reference signal into a baseband, in the normal operating phase, based on the combination of the transmit signal or of the signal derived from the transmit signal, so as to detect the transmit signal property based on the transmit signal mixed into the baseband or based on the signal derived from the transmit signal and mixed into the baseband, and to mix the transmit signal or the signal derived from the transmit signal, in the calibration operating phase, into a band shifted to the baseband in the combination of the second reference signal with the transmit signal or with the signal derived from the transmit signal, and to mix the self-introduced disturbing portion into the baseband so as to acquire the calibration signal from the disturbing portion mixed into the baseband;

wherein the reference signal provider comprises a first input terminal configured to receive the first reference signal, a second input terminal configured to receive the second reference signal, and an output terminal configured to provide the first reference signal and provide the second reference signal;

wherein the reference signal provider comprises a changeover switch configured to couple, in the normal operating phase, the first input terminal to the output terminal and couple, in the calibration operating phase, the second input terminal to the output terminal;

wherein the reference signal provider comprises a transmission path connected between the change-over switch and the second input terminal, wherein the transmission path comprises a first transmission path switch to decouple the second input terminal from the change-over switch in the normal operating phase;

wherein the transmission path of the reference signal provider further comprises a second transmission path switch and a shielded line, wherein the shielded line is connected between the first transmission path switch and the second transmission path switch;

wherein the reference signal provider is configured to decouple the shielded line from the second input terminal and from the change-over switch in the normal operating phase using the first transmission path switch and the second transmission path switch;

wherein the transmission path comprises an attenuator, an amplifier and a shielded line connected between the attenuator and the amplifier.

* * * * *